United States Patent [19]
Sancho et al.

[11] 3,853,333
[45] Dec. 10, 1974

[54] AUXILIARY SAFETY WHEEL

[75] Inventors: Joseph Sancho; Willie Elliott, both of Newark, N.J.

[73] Assignee: The Raymond Lee Organization, Inc., New York, N.Y. ; a part interest

[22] Filed: Sept. 12, 1972

[21] Appl. No.: 288,272

[52] U.S. Cl............................................ 280/150 A
[51] Int. Cl. ........................................... B60r 27/00
[58] Field of Search ........ 280/150 A, 293; 180/1 A; 248/62

[56] References Cited
UNITED STATES PATENTS

| | | | |
|---|---|---|---|
| 677,804 | 7/1901 | Schulte | 280/293 |
| 1,559,877 | 11/1925 | Huggins | 280/150 A |
| 1,863,473 | 6/1932 | Crisanti | 280/150 A |
| 2,102,835 | 12/1937 | Catalina | 280/150 A |

FOREIGN PATENTS OR APPLICATIONS

| 35,968 | 4/1926 | Denmark | 280/150 A |
|---|---|---|---|

*Primary Examiner*—Robert R. Song
*Attorney, Agent, or Firm*—Daniel Jay Tick

[57] ABSTRACT

An auxiliary safety wheel device comprises an auxiliary wheel of smaller diameter than the primary wheel of a vehicle. A mounting device affixes the auxiliary wheel to the axle in proximity with the primary wheel in a manner whereby the auxiliary wheel is normally free from contact with the ground, but comes into contact with the ground when the tire on the primary wheel is deflated.

3 Claims, 3 Drawing Figures

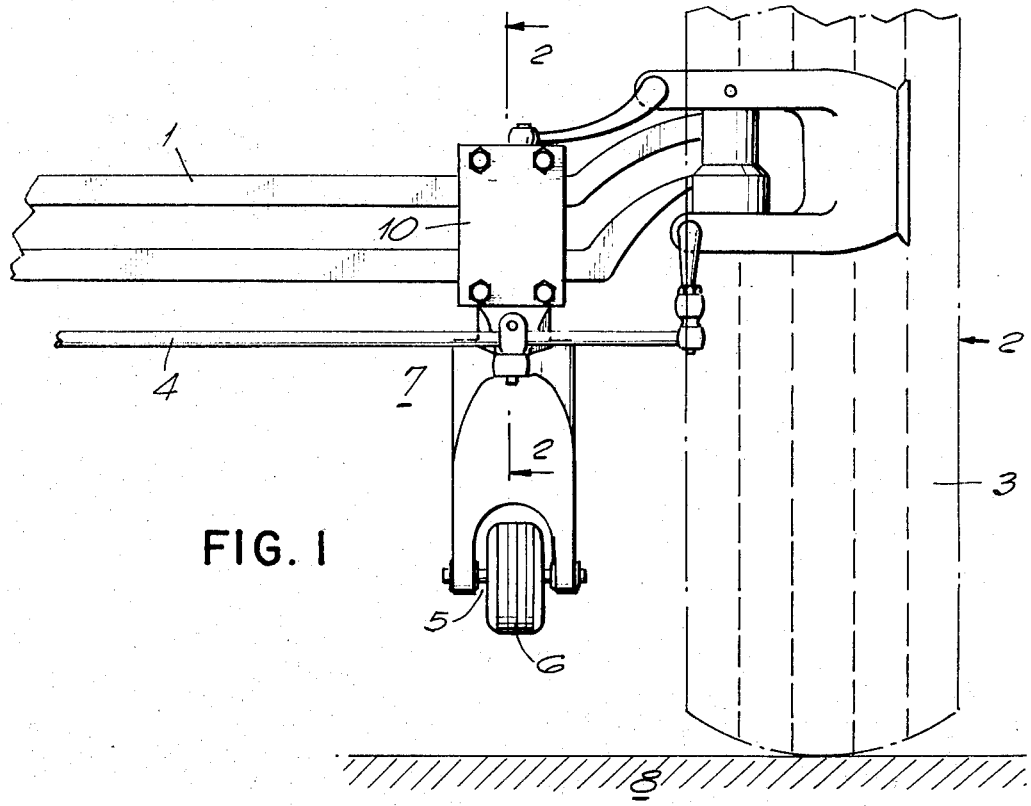
FIG. 1
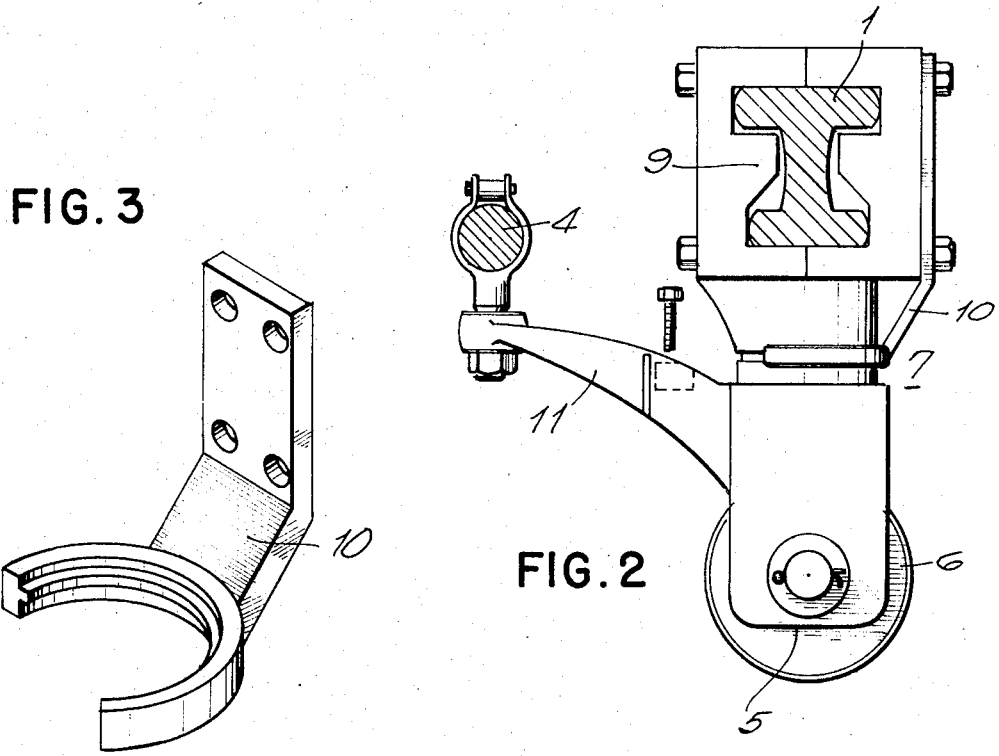
FIG. 3
FIG. 2

AUXILIARY SAFETY WHEEL

DESCRIPTION OF THE INVENTION

The present invention relates to an auxiliary safety wheel. More particularly, the invention relates to an auxiliary safety wheel device for a motor vehicle.

The principal object of the invention is to provide an auxiliary safety wheel device for a motor vehicle, which device is of simple structure, inexpensive in manufacture, and efficient, effective and reliable in preventing an accident when the vehicle has a flat tire or blowout during movement of the vehicle.

In order that the invention may be readily carried into effect, it will now be described with reference to the accompanying drawings, wherein:

FIG. 1 is a rear view of an embodiment of the auxiliary safety wheel device of the invention;

FIG. 2 is a view, on an enlarged scale, partly in section, taken along the lines II — II, of FIG. 1; and FIG. 3 is a perspective view of part of the mounting device of the auxiliary safety wheel device of the invention.

In the FIGS., the same components are indicated by the same reference numerals.

The auxiliary safety wheel device of the invention is for a motor vehicle (not shown in the FIGS.) having an axle 1 (FIGS. 1 and 2). A primary wheel 2 having a specific diameter is on the axles 1 and an inflated tire 3 is on the primary wheel 2. If the axle 1 is a front axle, the vehicle has a steering tie rod 4 (FIGS. 1 and 2) coupled to the primary wheel 2.

The auxiliary safety wheel device of the invention comprises an auxiliary wheel 5 (FIGS. 1 and 2) of smaller diameter than the primary wheel 2. The auxiliary wheel 5 has a solid rubber tire 6 on it (FIGS. 1 and 2).

A mounting device 7 affixes the auxiliary wheel 5 to the axle 1 in proximity with the primary wheel 2 (FIG. 1) in a manner whereby the auxiliary wheel is normally free from contact with the ground 8, but comes into contact with the ground when the tire 3 on the primary wheel is deflated.

The mounting device 7 includes a clamp 9 (FIG. 2) which removably clamps the auxiliary wheel 5 to the axle 1. A holding member 10 (FIGS. 1, 2 and 3) pivotally affixes the auxiliary wheel 5 to the axle 1.

A linkage 11 (FIG. 2) links the mounting device 7 to the steering tie rod 4 whereby the auxiliary wheel 5 is steerable in the same manner as the primary wheel 2.

We claim:

1. An auxiliary safety wheel device for a motor vehicle having an axle comprising substantially an I beam having spaced parallel flanges, a primary wheel having a specific diameter on the axle and an inflated tire on the primary sheel, said safety wheel device comprising an auxiliary wheel of smaller diameter than the primary wheel; and mounting means removably clamping the auxiliary wheel to the axle in proximity with the primary wheel in a manner whereby the auxiliary wheel is normally free from contact with the ground but comes into contact with the ground when the tire on the primary wheel is deflated, the mounting means comprising a pair of substantially E-shaped clamping members gripping the axle between them and a pair of bolts securing the clamping members to the axle substantially astride the flanges of the axle, each of the clamping members having three projections spaced from each other and clamping the axle in a manner whereby the flanges of the axle extend into the spaces between the projections.

2. An auxiliary safety wheel device as claimed in claim 1, wherein the auxiliary wheel has a solid rubber tire on it.

3. An auxiliary safety wheel device as claimed in claim 1, wherein the axle is a front axle and the vehicle has a steering tie rod coupled to the primary wheel, and wherein the mounting means pivotally affixes the auxiliary wheel to the axle, and further comprising a linkage from the mounting means to the steering tie rod whereby the auxiliary wheel is steerable in the same manner as the primary wheel, the linkage comprising a substantially symmetrical O-shaped clamp having a longitudinal slit and planar extensions at the slit and a bolt securing the clamp around the tie rod at its planar extensions.

* * * * *